United States Patent [19]

Minkoff

[11] 4,210,341
[45] Jul. 1, 1980

[54] TRANSPORT APPARATUS

[76] Inventor: William Minkoff, 15703 Redington Dr., Redington Beach, Fla. 33708

[21] Appl. No.: 889,734

[22] Filed: Mar. 24, 1978

[51] Int. Cl.² .............................................. B62B 3/04
[52] U.S. Cl. ................................... 280/79.1 A; 5/510
[58] Field of Search ...................... 280/79.1 A, 79.1 R, 280/47.13 R, 47.19, 47.35, 785; 5/509–511

[56] References Cited

U.S. PATENT DOCUMENTS

| 605,162 | 6/1898 | Deane | 280/47.13 R |
| 1,604,723 | 10/1926 | Rutherford | 280/47.13 R |
| 2,774,609 | 12/1956 | Winger | 280/79.1 |
| 2,860,007 | 11/1958 | Cornelius | 280/47.13 R X |
| 2,947,565 | 8/1960 | Wood | 280/79.1 X |
| 3,136,429 | 6/1964 | Kleinschmidt | 5/510 X |
| 3,580,601 | 5/1971 | Miles | 280/47.13 R |
| 3,751,758 | 8/1973 | Higbee et al. | 280/79.1 R X |
| 3,879,796 | 4/1975 | Whyte | 5/510 |
| 3,964,762 | 6/1976 | Adams | 280/79.1 X |

Primary Examiner—John J. Love
Assistant Examiner—Norman L. Stack
Attorney, Agent, or Firm—Arthur W. Fisher

[57] ABSTRACT

A transport apparatus comprising a pair of substantially identical dolly devices for moving hospital beds and the like. Each dolly device comprises an elongated base plate having a pair of swivel mounted casters or wheels attached to the lower surface thereof and an attachment member formed on the elongated base plate configured to operatively engage and secure the hospital bed thereto.

7 Claims, 3 Drawing Figures

U.S. Patent     Jul. 1, 1980     4,210,341
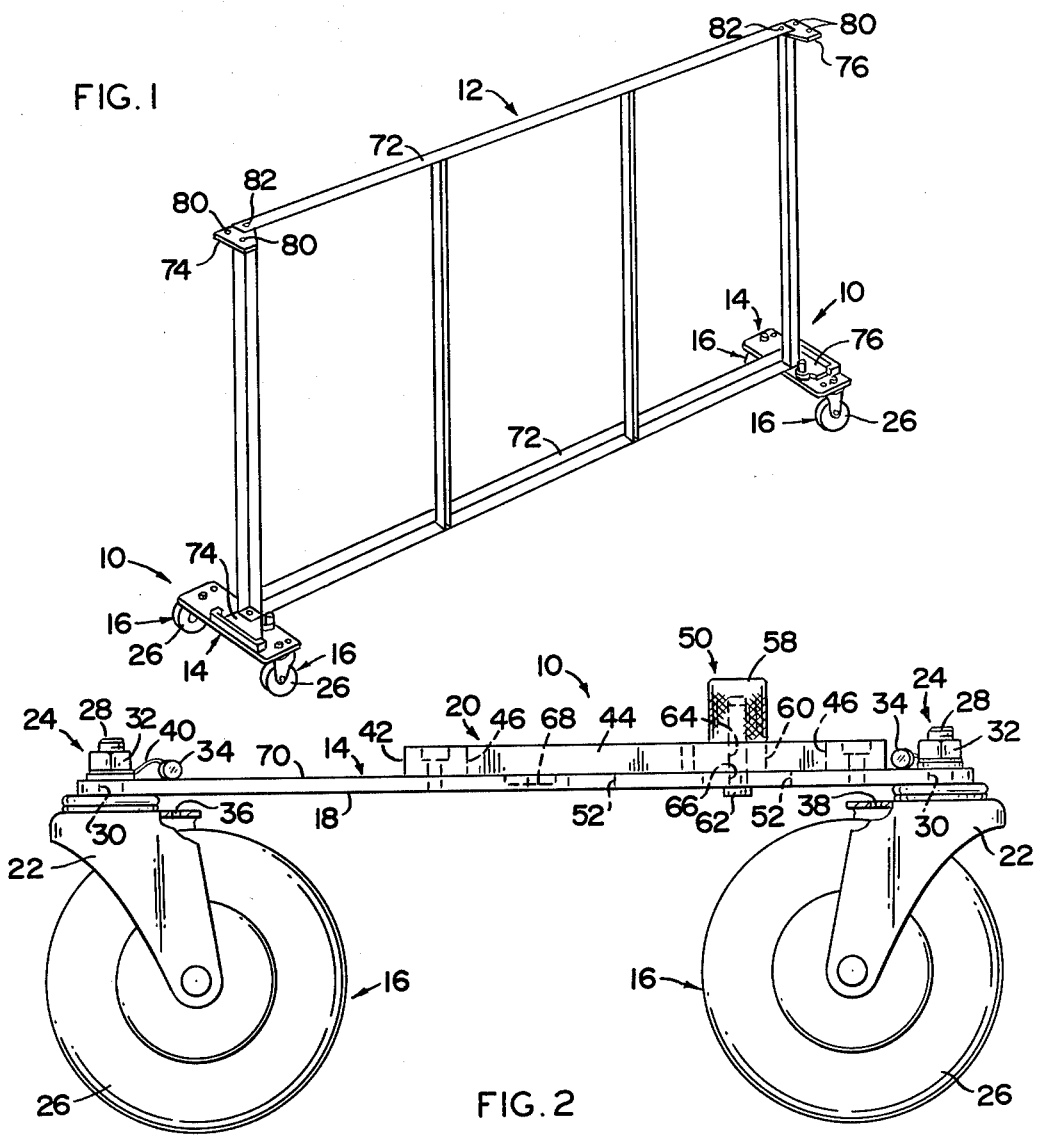
FIG. 1
FIG. 2
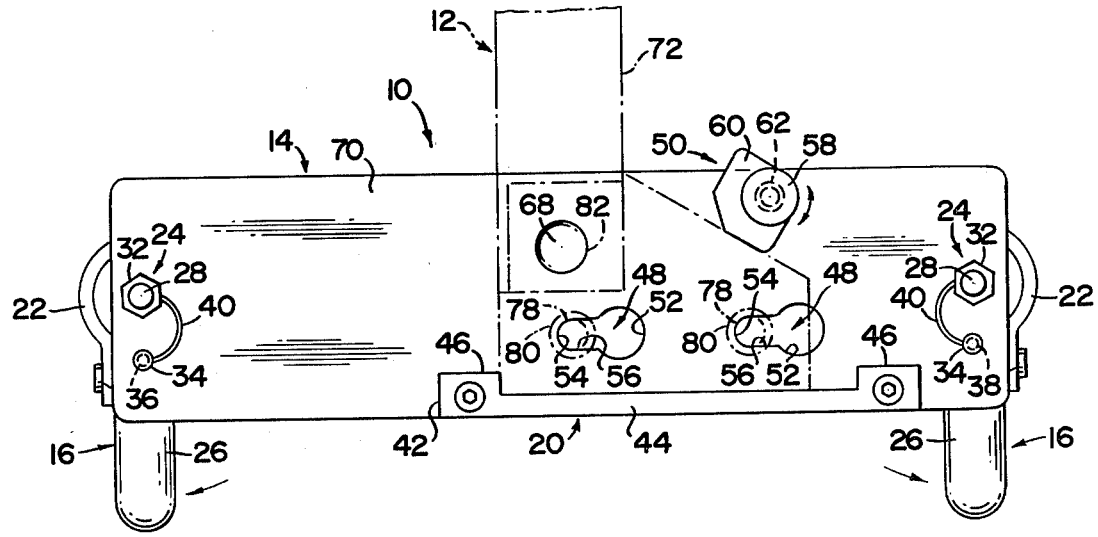
FIG. 3

TRANSPORT APPARATUS

BACKGROUND OF THE INVENTION

1. Field of the Invention

A transport apparatus comprising a pair of substantially identical dolly devices for moving hospital beds and the like.

2. Description of the Prior Art

Numerous efforts have been made to provide means to facilitate the moving of articles with roller-carriages or dollys where the weight and/or size does not allow it to be otherwise easily moved.

Some such roller-carriages includes adjustable cam-clamps to secure the articles thereto during moving.

Other devices include elaborate support platforms with handles or the like. Typical of such structures are U.S. Pat. Nos. 150,264; 605,162; 2,816,771; 3,580,601; 3,837,666; and 3,942,813. Additional examples are disclosed in U.S. Pat. Nos. 1,339,861; 2,816,771; and U.S. Pat. No. 3,845,969 together with United Kingdom Pat. No. 1,322,080. and U.S. Pat. No. 605,162 discloses a transfer truck including an adjustable lock while U.S. Pat. No. 3,845,969 shows a pair of vertically spaced retainer openings or apertures. U.S. Pat. No. 1,339,861 teaches a fastening means or member 11, U.S. Pat. No. 2,816,771 teaches the use of a diagonally extending retainer element and U.K. Pat. No. 1,322,080 discloses the application of a lip or retainer.

A particularly useful transport means similar to the present invention is disclosed in applicant's co-pending Pat. application Ser. No. 766,253, filed on Feb. 7, 1977, now U.S. Pat. No. 4,098,518 issued July 4, 1978.

Thus the need still remains to provide a device of the kind to be described which is simple and efficient in operation and low in cost of operation and maintenance, thus reducing the cost of equipment while improving the service.

SUMMARY OF THE INVENTION

The present invention relates to a transport apparatus comprising a pair of substantially identical dolly devices for moving hospital beds or the like. More specifically, each dolly device comprises an elongated base plate having a pair of swivel mounted casters or wheels attached to the lower surface thereof and an attachment member formed on the elongated base plate configured to operatively engage and secure the hospital bed thereto.

Each swivel mounted caster comprises a bracket rotatably attached to the elongated base plate by a fastening means and a caster or wheel rotatably attached to the bracket. The fastening means comprises an elongated element such as a threaded bolt and a coupling element such as a nut attached to the upper end thereof. Each swivel mounted caster further includes a caster lock comprising an elongated cylindrical pin and apertures formed in the elongated base plate and bracket to lock the casters or wheels in line parallel to the bed when the transport apparatus is in use.

Each attachment means comprises a retainer element comprising a member disposed along the longitudinal axis of the elongated base plate and a pair of end members extending inwardly from opposite ends thereof to receive the bed as more fully described hereinafter. Each attachment means further includes a pair of retainer apertures and a frame lock. The retainer apertures are configured to receive the bed as more fully described hereinafter. The frame lock comprises a tightener member and cam element coupled to the elongated base plate by a lock connector.

In use, the bed is set on its side on top of a pair of dolly devices. The bed comprises a pair of rails having head and foot flanges formed on opposite ends thereof. The head and foot flanges each include a pair of frame connectors with enlarged tips formed thereon to attach the head and foot boards.

To affix the bed to the dolly devices, the frame connectors and enlarged tips are passed through the retainer apertures formed in the elongated base plate. The bed then secured to the dolly device by rotating cam element to engage the side of head and foot flanges and then tightened the tightener member. To prevent the brackets from rotating during transit, the elongated cylindrical pin is passed through the apertures to lock the caster or wheels in line parallel to the longitudinal axis of the bed. Balance is maintained since the attachment means is disposed at the cent of gravity of the dolly device.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a perspective view of the transport means in supporting relationship with a bed.

FIG. 2 is a side view of a dolly device.

FIG. 3 is a top view of a dolly device.

Similar reference characters refer to similar parts throughout the several views of the drawings.

DETAILED DESCRIPTION OF THE PREFERRED EMBODIMENT

As shown in FIGS. 1 through 3, the transport apparatus of the present invention comprises a pair of substantially identical dolly devices each generally indicated as 10 specifically configured for moving hospital beds or the like generally indicated as 12.

As best shown in FIGS. 2 and 3, each dolly device 10 comprises an elongated base plate generally indicated as 14 having a pair of swivel mounted casters or wheels each generally indicated as 16 attached to the lower surface 18 thereof and an attachment means generally indicated as 20.

Each swivel mounted caster 16 comprises a bracket 22 rotatably attached to the elongated base plate 14 by a fastening means generally indicated as 24 and a caster or wheel 26 rotatably attached to the bracket 22. The fastening means 24 comprises an elongated element such as a threaded bolt 28 attached to the bracket 22 extending through aperture 30 formed in the elongated base plate 14 and a coupling element such a nut 32 attached to the upper end thereof. Each swivel mounted caster 16 further includes a caster lock comprising an elongated cylindrical pin 34, first and second apertures 36 and 38 respectively, formed in the elongated base plate 14 and bracket 22 respectively, and flexible interconnecting element 40 coupling the elongated cylindrical pin 34 to the threaded bolt 28. The caster lock is provided to lock the caster or wheels 26 in line parallel to the longitudinal axis of the bed 12 when the transport apparatus is in use.

As best shown in FIGS. 2 and 3 each attachment means 20 includes a retainer element 42 comprising a retainer member 44 disposed along the longitudinal axis of the elongated base plate 14 and a pair of end members 46 extending inwardly from opposite ends thereof to receive the bed 12 as more fully described hereinafter. Each attachment means 20 further includes a pair of retainer apertures or slots 48 and a frame lock 50. Each retainer aperture 48 comprises an enlarged retainer opening 52 and reduced retainer opening 54 to operatively receive the bed 12 as more fully described hereinafter. The frame lock 50 comprises a tightener member 58 and a cam element 60 coupled to the elongated base plate 14 by a lock connector 62. The tightener member 58 is fixedly attached to the upper portion of the lock connector 62 while the cam element 60 is rotatably mounted on the lock connector 62. The cam element 60 comprises a member having its periphery unequal distances from the vertical center of the lock connector 62 to accommodate beds 12 of various sizes. The lock connector 62 comprises an elongated threaded pin affixed to the tightener member 58 and extending through apertures 64 and 66 formed in the cam element 60 and elongated base plate 14 respectively. The aperture 66 is threaded to permit tightening of the frame lock 50 to the elongated base plate 14 to receive a portion of the bed 12 as more fully described hereinafter. To maintain balance of the bed 12 while on the transport apparatus, the attachment means 20 is disposed at substantially the center of gravity of the dolly device 10.

As shown in FIGS. 1 and 3, the bed 12 is set on its side on top of a pair of dolly devices 10. The bed 12 comprises a pair of rails 72 having head and foot flanges 74 and 76 formed on opposite ends thereof. Each head and foot flange 74 and 76 respectively includes a pair of connectors 78 having enlarged tips 80 formed on the outer portion thereof and fastener 82 formed thereon to secure the flanges 74 and 76 to the rails 72. The rail 72 and head and foot flanges 74 and 76 respectively extend over the elongated base plates 14 such that the edges thereof engage the retainer member 44 between the end member 46.

To affix the bed 12 to the dolly devices 10, the connectors 78 and enlarged tips 80 are passed through the enlarged retainer openings 52 formed in the elongated base plate 14. The rails 72 are then moved laterally to register with the reduced retainer openings 54. The enlarged tips 80 are larger than the reduced retainer opening 54 and smaller than the enlarged retainer opening 52. The bed 12 is then secured to the dolly device 10 by rotating cam element 60 to engaged the side of head and foot flanges 74 and 76 respectively and then tightened by rotating tightener member 58. To prevent the brackets 22 from rotating during transit, the elongated cylindrical pin 34 is passed through apertures 36 and 38 to lock the caster or wheels 26 in line parallel to the longitudinal axis of the bed 12 and substantially perpendicular to the longitudinal axis of the bed 12.

It will thus be seen that the objects set forth above, among those made apparent from the preceding description are efficiently attained and since certain changes may be made in the above construction without departing from the scope of the invention, it is intended that all matter contained in the above construction without departing from the scope of the invention, it is intended that all matter contained in the above description or shown in the accompanying drawings shall be interpreted as illustrative and not in a limiting sense.

It is also to be understood that the following claims are intended to cover all of the genric and specific features of the invention herein described, and all statements of the scope of the invention which, as a matter of language, might be said to fall therebetween.

Now that the invention has been described, what is claimed is:

1. A transport apparatus comprising a pair of dolly devices for moving beds which include side rails having head and foot frames formed on opposite ends thereof wherein the head and foot frames each have at least one connector formed thereon, each said dolly device comprising an elongated base plate, a pair of swivel mounted casters attached to opposite ends of said elongated base plate and attachment means formed on said elongated base plate to engage the bed, said attachment means comprising at least one retainer aperture including an enlarged retainer opening and reduced retainer opening formed on said elongated base plate to receive the connector of the head and foot frames, a retainer element comprising a retaining member disposed along the longitudinal axis of said elongated base plate and at least one end member extending inwardly from one end thereof to engage the head and foot frames of the bed, and a frame lock comprising a tightener member and cam element coupled to said elongated base plate by a lock connector, said tightener member fixedly attached to the upper portion of said lock connector and said cam element rotatably mounted on said lock connector to engage the head and foot frames, said cam element comprises a member having its periphery unequal distances from its point of rotation, said tightener member movable between a locked and unlocked position to selectively lock said cam element in securing engagement with the head and foot frames.

2. The transport apparatus of claim 1 wherein said retainer aperture is disposed longitudinally along the length of said elongated base plate.

3. The transport apparatus of claim 1 wherein said lock connector comprises an elongated threaded pin attached to said tightener member extending through apertures formed in said cam element and said elongated base plate.

4. The transport apparatus of claim 3 wherein said elongated base plate further includes a recess formed in the upper surface thereof to receive a portion of the bed.

5. The transport apparatus of claim 1 further including a caster lock to lock the caster in line parallel to the longitudinal axis of the bed when said transport apparatus is in use.

6. The transport apparatus of claim 5 wherein said caster lock comprises an elongated cylindrical pin configured to pass through a first aperture formed in said elongated base plate and a second aperture formed in said casters.

7. The transport apparatus of claim 6 wherein said caster lock further includes a flexible interconnecting element coupling said elongated cylindrical pin to said elongated base plate.

* * * * *